Dec. 21, 1926.

O. JOHNSON

FISH LURE

Filed March 6, 1926

1,611,644

INVENTOR.
OTIS JOHNSON
BY
ATTORNEYS.

Patented Dec. 21, 1926.

1,611,644

UNITED STATES PATENT OFFICE.

OTIS JOHNSON, OF PORTLAND, OREGON.

FISH LURE.

Application filed March 6, 1926. Serial No. 92,870.

The present invention relates to improvements in lures or artificial bait for use in connection with fish hooks.

The general object of the invention is the provision of a lure suitable for use in casting or trolling operations and adapted for simulating the movements of a frightened fish by rolling and darting forwardly at intervals while being dragged through the water.

The above and other objects are accomplished by instrumentalities pointed out in the following specification.

The invention is clearly defined in the claims.

A satisfactory embodiment of the invention is illustrated in the accompanying drawings forming part of the specification and in which—

Figure 1:
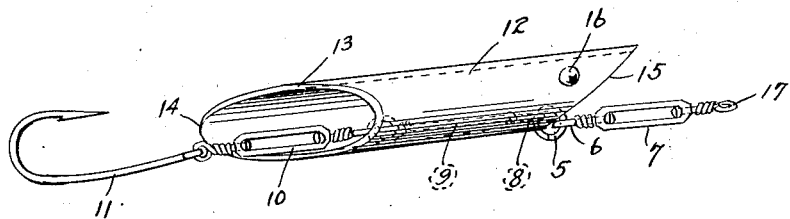
Figure 1 is a perspective of the invention.
Figure 2:
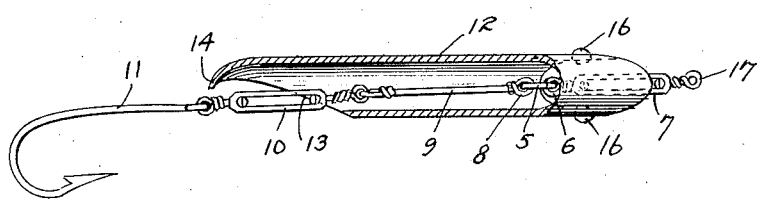
Figure 2 is a side elevation with a portion of the spoon or tubular body broken away to disclose the relation of other parts.
Figure 3:
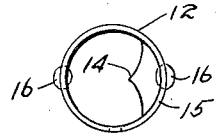
Figure 3 is a detail end elevation of the spoon or body.

A supporting element herein shown as a metallic ring 5 is connected to the eye 6 at one end of the leader swivel 7 and is also connected to the eye 8 of a link 9 to which is connected the hook swivel 10 which carries the hook 11. The spoon or body portion 12 is tubular and preferably of metal. The dimensions of the spoon 12 will, of course, vary in accordance with its use in connection with the luring of small or large fish. The assembly is such that the link 9 and hook swivel 10 are passed through the spoon from one end thereof and the supporting member or ring 5 is connected to the spoon by extending through an opening therein. With this construction the weight of a fish on hook 11 will be entirely carried by the swivel 7, support 5, link 9 and swivel 10, and not by the spoon 12.

The end surface of spoon 12 adjacent to hook 11 is sloped, as indicated by 13, and the outermost portion is curved inwardly as at 14 to provide the equivalent of a blade which operates to impart a rolling or turning movement to the spoon by acting upon the water in the act of dragging the spoon therethrough as when trolling. The opposite end of the spoon 12 or that remote from blade 14 is also provided with a sloping surface 15 which is disposed in angular relation to the surface 13. As shown in Figure 1 the sloping surfaces combine to impart to the spoon the appearance of a small fish and the body of the spoon at opposite points adjacent to the surface 15 is pierced for the reception of colored beads 16. The presence of these colored beads adds to the fish attracting properties of the device as a whole.

In the use of the device one end of the ordinary leader carried by the fish line (not shown) is attached to the eye 17 of swivel 7. When the device is in the water and moved therethrough either by being pulled, as when casting, or dragged, as when trolling, the water by operating on blade 14 will rotate or roll the spoon on the swivel 7. In that the supporting member or ring 5 engages with the spoon at a point adjacent to one side of the axis of the spoon, the spoon will be normally overbalanced and its resistance to forward movement in the water will vary. By virtue of this variable resistance, the spoon in rolling and moving forwardly will dart forwardly at intervals and thereby simulate the darting movements of a frightened fish.

Although I have shown and described one embodiment of my invention, it is to be understood that the same is susceptible of various changes; and I reserve the right to employ such as may come within the scope of the appended claims.

I claim:

1. A fish lure comprising a rotatable support, an open ended tubular spoon having one end connected to the support and its opposite end provided with an inwardly sloped blade, and a hook carrying member extending through the spoon and connected to the support.

2. A fish lure comprising a rotatable support, an open ended tubular spoon connected at one end to the support, and having its opposite end provided with a sloped surface and inturned to provide a blade.

3. A fish lure comprising a rotatable support, an open ended tubular spoon connected at one end to the support, and having its opposite end provided with a sloped surface and inturned to provide a blade, and a hook carrying member extending through the spoon and having one end rotatably connected to the support.

4. A fish lure comprising a rotatable support having one end adapted to be connected to a fish line, an open ended tubular spoon connected at one end to the support and having angularly disposed sloped end surfaces, one of which is provided with an inwardly extending blade and a hook carrying member extending through the spoon and connected to the support.

5. In a fish lure, a spoon comprising an oblong tubular open ended member, the opposite end portions of which are sloped and disposed in angular relation, one end of said member being provided with oppositely disposed colored beads and the other with an inturned portion constituting a blade.

OTIS JOHNSON.